Aug. 10, 1926.

J. D. O'BRIEN 1,595,915

PLUG

Filed June 15, 1925

WITNESSES
H. T. Walker

INVENTOR
J. D. O'Brien
BY
ATTORNEYS

Patented Aug. 10, 1926.

1,595,915

UNITED STATES PATENT OFFICE.

JAMES DENNIS O'BRIEN, OF BROOKLYN, NEW YORK.

PLUG.

Application filed June 15, 1925. Serial No. 37,262.

This invention relates to plugs, and has particular reference to a removable plug for use in connection with boilers, preheaters, economizers, oil stills, or other similar capacities.

Plugs of this type which are now in general use, depend upon a gasket or washer for a positive sealing action, and threaded elements or other securing means are employed for sealing devices of this nature and for maintaining the same in sealed condition. Hence the great pressures which plugs of this type are intended to withstand, often cause leaks and serious consequences result therefrom.

The present invention comprehends a plug having a conical head designed for engagement within an outwardly tapering conical opening, the construction of which renders the same insertable from the exterior into said opening, after which the internal pressure functions to seal and maintain the plug in seated relation within the opening without in any way affecting the securing means.

From the foregoing it will thus be seen that one of the principal advantages of the present invention resides in the provision of a plug which positively precludes blowouts, and which can be so constructed as to present no projections or obstructions on the interior of the structure to which it is applied to retard circulation, collect sediments or admit of corrosion.

The invention furthermore comprehends a plug of the character described, which is extremely simple in its construction and mode of insertion and removal, inexpensive to manufacture, and which is thoroughly reliable and highly efficient in its purpose.

With the above recited and other objects in view, the invention resides in the novel construction set forth in the following specification, particularly pointed out in the appended claims, and illustrated in the accompanying drawings it being understood that the right is reserved to embodiments other than those actually illustrated herein to the full extent indicated by the general meaning of the terms in which the claims are expressed.

In the drawings—

Figure 1:
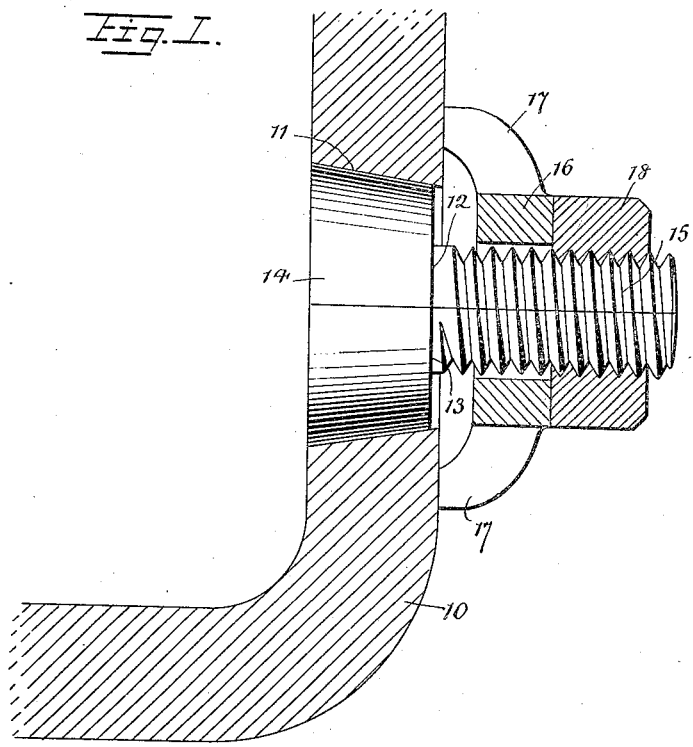
Figure 1 is a sectional view illustrating a plug constructed in accordance with the invention in applied position.
Figure 2:
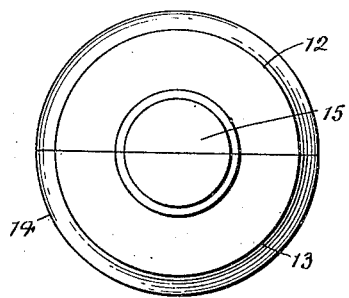
Fig. 2 is an end view of the plug.
Figure 3:
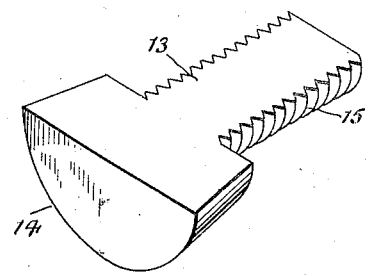
Fig. 3 is a perspective view of one of the mating sections thereof.

Referring to the drawings by characters of reference, 10 designates a portion of a boiler, superheater, economizer, or other similar structure, having an outwardly tapered conical opening 11 for the reception of a plug which constitutes the present invention, and which plug includes mating sections 12 and 13 of substantially identical construction, which when brought together, provide a complementary inwardly tapered conical head 14 and a threaded stem 15. By forming the plug of mating sections, first one section is inserted within the opening 11 and moved to a position to permit of the insertion of the other section. The two sections are then brought together and pulled outwardly until the taper of the plug engages the complementary tapered seat formed by the opening 11. A washer 16 having radial inwardly bent bearing arms 17 engageable with the outer surface of the structure 10 around the opening 11, is then positioned over the stem 15, and a nut 18 is threaded over the threaded stem 15 to assist in initially drawing the head 14 of the mated sections into tight sealing engagement within the seat formed by the opening 11. It thus follows that the internal pressure within the structure 10 will tend to drive the head 14 into tighter sealing engagement whereby dependence upon the threaded securing means for the sealing action is eliminated. It is also proposed that the head 14 will be of such a relative size to the opening 11 that the outer end of the head will be flush with the inner wall of the structure 10, so as to provide no projection which will retard circulation, collect sediment, or allow for corrosion.

From the foregoing it will be seen that an extremely simple, inexpensive and highly efficient plug has been devised for the purpose specified.

What is claimed:

1. A plug for engagement within an outwardly tapering opening formed in a boiler head or the like member, comprising complementary mating sections, each consisting of a semi-frusto-conical head portion and a threaded semi-cylindrical stem portion, said sections when mated adapted to provide a conical head tapering toward the stem and a nut adapted to engage over and lock the threaded stem portions when mated, said nut also constituting means for effecting the drawing of the head of the plug outwardly to and retaining the same in a sealing relation with respect to the opening.

2. A plug for engagement within an outwardly tapered opening formed in a boiler head or the like member, comprising camplementary mating sections, each consisting of a semi-frusto-conical head portion and a threaded semi-cylindrical stem portion, said sections when mated adapted to provide a conical head tapering toward the stem, a nut adapted to engage over and lock the threaded stem portions when mated, and a bearing element engageable with the member to constitute an abutment against which the nut operates to effect the drawing of the head of the plug outwardly to sealing relation with respect to the opening, the said sectional structure of the plug permitting of the insertion and removal of the same through the constricted outer end of the opening by separation of the sections, the stem portions serving as means for facilitating said insertion and removal.

3. The combination with a hollow structure adapted to contain fluids under pressure, having an outwardly tapered opening; of a plug insertable from the exterior of the structure for sealing said opening, comprising sections including a head portion and a stem portion, which head portions when the sections are mated providing a tapered head of a size to fill and seal the opening by outward movement thereof, the sections adapted for separation to facilitate the insertion thereof through the opening, the said stem portions when the sections are mated formed with mating means adapted for interengagement with a device for drawing the plug outwardly to sealing relation, the said device consisting of a nut having a threaded bore and a bearing element engageable with the outer side of the wall of the structure, and the said mating means on the stems consisting of registering thread sections.

JAMES DENNIS O'BRIEN.